United States Patent [19]
Fouche et al.

[11] 3,821,197
[45] June 28, 1974

[54] PROCESS FOR THE PREPARATION OF 10,11-DIHYDRO-DIBENZO(B,F)AZEPINONES

[75] Inventors: Jean Fouche, Bourg-la-Reine; Andre Leger, Massy, both of France

[73] Assignee: Rhone-Poulenc S.A., Paris, France

[22] Filed: Jan. 17, 1972

[21] Appl. No.: 218,528

[30] Foreign Application Priority Data
Jan. 19, 1971 France .............................. 71.01647

[52] U.S. Cl. .................... 260/239 D, 260/247.5 B, 260/268 TR, 260/293.59, 260/326.5 CA, 260/471 R
[51] Int. Cl. ........................................... C07d 41/08
[58] Field of Search .... 260/239 D, 293.59, 247.5 B, 260/268 TR, 326.5 CA

[56] References Cited
OTHER PUBLICATIONS
Elderfield, Heterocyclic Compounds, Vol. 9, (New York, 1967), pages 240–248. QD400E4.

Primary Examiner—Joseph A. Narcavage
Attorney, Agent, or Firm—Stevens, Davis, Miller & Mosher

[57] ABSTRACT

10,11-Dihydro-dibenzo[b,f]azepinones in which the nitrogen is substituted by alkyl, phenylalkyl, or aminoalkyl, which have, or are intermediates for compounds having, useful pharmacological activity are made by cyclizing corresponding alkyl esters of N-substituted N-ortho-tolylanthranilic acids with alkali metal amides in the presence of hexamethylphosphotriamide.

6 Claims, No Drawings

PROCESS FOR THE PREPARATION OF 10,11-DIHYDRO-DIBENZO(B,F)AZEPINONES

The present invention provides a new process for the preparation of 10,11-dihydrodibenzo[b,f]azepinones of the formula:

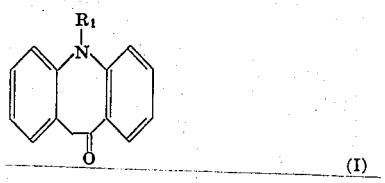

(I)

in which $R_1$ is an alkyl radical of one to five carbon atoms, a phenylalkyl radical of which the alkyl portion contains one to five carbon atoms and of which the phenyl nucleus is unsubstituted or substituted by one or more halogen atoms, alkyl radicals of one to five carbon atoms, alkoxy radicals of one to five carbon atoms, or trifluoromethyl radicals, or a radical of formula:

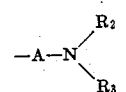

in which A represents an alkylene radical of two to six carbon atoms and $R_2$ and $R_3$, which may be identical or different, each represent an alkyl radical of one to five carbon atoms, and one of the radicals $R_2$ and R can be attached to one of the carbon atoms of the alkylene radical A to form a nitrogen-containing heterocyclic structure such as 2-piperidyl, 3-piperidyl or 4piperidyl, or both radicals $R_2$ and $R_3$, together with the nitrogen atom to which they are bonded, form a nitrogen-containing heterocyclic ring with five or six ring atoms, which may contain a second nitrogen atom, or an oxygen or sulphur atom, and which is unsubstituted or substituted by one or more alkyl radicals of one to five carbon atoms such as 1-pyrrolidinyl, piperidino, morpholino or 4-methyl-1-piperazinyl. It will be understood that, in all the preceding and following text, the carbon atoms of the alkyl and alkylene radicals and the alkyl portions of the various radicals may be in a straight or branched chain.

Hitherto, the compound of the formula (I) have been prepared by hydrolysis, preferably in an acid medium, of a compound of the formula:

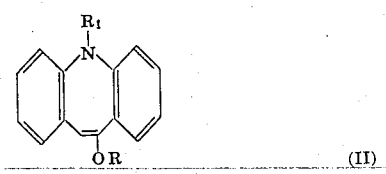

(II)

in which $R_1$ is as defined above and R is an alkyl radical of one to five carbon atoms, as described in German Pat. No. 1,142,870 and French Pat. No. 1,298,923. The compounds of the formula (II) are obtained by reaction of a reactive ester of the formula:

$R_1 - X$ (III)

in which $R_1$ is as defined above and X represents a reactive ester residue, such as a halogen atom or a sulphate or sulphonate ester radical (for example a methanesulphonyloxy or p-toluenesulphonyloxy radical), with a compound of the formula:

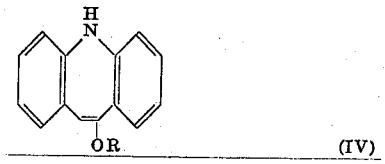

(IV)

in which R is as defined above. The compounds of the formula (IV) are themselves prepared from 5-acyl-10,11-dihydro-dibenzo[b,f]azepines by bromination in the 10-position with N-bromo-succinimide, dehydrobromination in an alkaline medium, attachment of two bromine atoms in positions 10 and 11 of the 5-acyl-dibenzo[b,f]azepines thus obtained, dehydrobromination in an alkaline alcoholic medium and, finally, reaction of the 5-acyl-10-bromo-dibenzo[b,f]azepines thus obtained with an alkali metal alcoholate of an aliphatic alcohol of one to five carbon atoms.

The known synthesis of the compounds of formula (I) thus requires the preparation of various dibenzo[b,f]-azepine derivatives prior to the introduction of the ketone group into the molecule.

According to the present invention, the compounds of formula (I) are obtained by cyclisation of an ester of the formula:

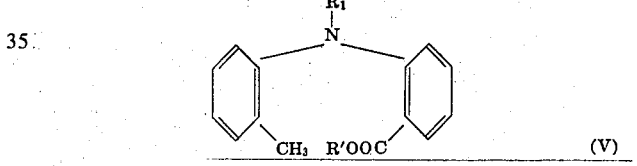

(V)

in which $R_1$ is as defined above and $R'$ is an alkyl radical of one to five carbon atoms, by reaction with an alkali metal amide of the formula:

(VI)

in which M represents an alkali metal atom such as lithium, potassium or sodium, and $R_4$ and $R_5$, which may be identical or different, each represent an alkyl radical of one to five carbon atoms or form, together with the nitrogen atom to which they are bonded, a nitrogen-containing heterocyclic ring with five or six ring atoms which may contain a second hetero-atom, such as oxygen, e.g., 1-pyrrolidinyl, piperidino or morpholino, in the presence of at least one mol of hexamethylphosphotriamide per mol of ester of the formula (V), and optionally in an inert organic solvent such as an aromatic hydrocarbon, for example benzene, toluene or a xylene, a saturated aliphatic or cyclic hydrocarbon, for example cyclohexane, or an ether such as diethyl ether, tetrahydrofuran, 1,2-dimethoxyethane, or dioxane.

The reaction is generally carried out at a temperature of between −25° and +50°C. and preferably between 20° and 40°C, using a minimum of 3 mols and preferably 4 to 6 mols, of alkali metal amide of the formula (VI) per mole of ester of the formula (V). It is particularly advantageous to use a lithium amide.

The alkali metal amides of formula (VI) can be prepared by any known method of preparation of alkali metal amides. Amongst these, the method described in French Pat. No. 1,581,016 has the advantage of being an industrial method by which large quantities of amides of formula (VI) may be obtained.

The esters of formula (V) can be obtained by reaction of a reactive ester of the general formula (III) with the sodium derivative of an alkyl N-ortho-tolyl-anthranilate, itself obtained from the corresponding acid. Where $R_1$ represents an alkyl radical, it can be advantageous to carry out the N-alkylation and esterification of the N-ortho-tolylanthranilic acid simultaneously by reaction of a reactive alkyl ester, for example the sulphate, halide, methanesulphonate or p-toluenesulphonate, with the sodium salt of the acid.

The products of formula (I) can if desired be purified by physical methods such as distillation, crystallisation or chromatography. If the radical $R_1$ contains an amino group it is also possible to purify the products of formula (I) by chemical methods such as the formation and crystallisation of salts, followed by their decomposition in an alkaline medium. In these operations the nature of the anion of the salt is immaterial, the only condition being that the salt should be well-defined and easily crystallisable.

The products of formula (I) in which $R_1$ represents an alkyl or phenylalkyl radical as defined above, are useful starting materials for the preparation of amines derived from 10,11-dihydro-dibenzo[b,f]azepine possessing valuable pharmacological properties, which are described in French Pat. No. 1,532,301.

The compounds of formula (I) wherein $R_1$ represents the radical

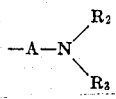

as defined above and their salts, which are described in French Pat. No. 1,298,923, have valuable pharmacological properties which make them useful as medicines.

The Examples which follow illustrate the invention.

EXAMPLE 1

Lithium (9.15 g.) is cut up and collected in a mixture of anhydrous benzene (111 cc.) and anhydrous hexamethylphosphotriamide (295 cc.). A solution (273 cc.) of dimethylamine in anhydrous benzene, containing 4.95 mols per litre, is added to the stirred suspension under an argon atmosphere at about 20°C. The mixture is stirred at 20°C. until the lithium has disappeared. A solution of 2-methyl-2'-methoxycarbonyl-N-methyldiphenylamine (103.9 g.) in anhydrous cyclohexane (440 cc.) is then added to the lithium dimethylamide solution so obtained over the course of 10 minutes, without exceeding 40°C. After the addition, the reaction mixture is kept at ambient temperature for ten minutes and is then poured into a solution of sodium chloride (100 g.) in iced water (3,000 cc.). The organic product is extracted three times with diethyl ether (a total of 1,050 cc.). The combined organic extracts are successively washed with distilled water (500 cc.), N aqueous hydrochloric acid solution (500 cc.), distilled water (500 cc.), 2 percent aqueous solution of sodium bicarbonate (400 cc.) and distilled water (500 cc.). The organic solution is treated with vegetable charcoal (1 g.), dried over anhydrous sodium sulphate and concentrated. The hot residue (110 g.) is dissolved in boiling ethanol (150 cc.). After 16 hours' cooling at 2°C, the crystals which have appeared are filtered off, washed first with ice-cold ethanol (20 cc.) and then with isopropyl ether (40 cc.), and dried under reduced pressure (20 mm.Hg). 5-Methyl-10,11-dihydro-dibenzo[b,f]azepinone-10 (75.1 g.), m.p. 106°C, is obtained.

The 2-methyl-2'-methoxycarbonyl-N-methyldiphenylamine starting material can be prepared as follows: Preparation of N-ortho-tolylanthranilic acid (m.p. 190°C.) by the method of Massie et al., J. Org. Chem., 21, 347 (1956). Preparation of 2-methyl-2'-methoxycarbonyl-N-methyldiphenylamine (103.9 g.) (b.p. 124°–129°C/0.1 mm.Hg; m.p. 39°–40°C.) by reaction of sodium hydride (42.2 g.), followed by methyl sulphate (222 g.) with N-orthotolylanthranilic acid (100 g.) in 1,2-dimethoxyethane at about 60°C.

EXAMPLE 2

Lithium (1.40 g.) is cut up and collected in a mixture of anhydrous benzene (16 cc.) and anhydrous hexamethylphosphotriamide (47 cc.). A solution (45 cc.) of dimethylamine in anhydrous benzene, containing 4.7 mols per litre, is added to the stirred suspension under an argon atmosphere at about 20°C. The mixture is stirred at 20°C. until the lithium has disappeared. A solution of 2-methyl-2'-methoxycarbonyl-N-(3-dimethylaminopropyl)-diphenylamine (10.1 g.) in anhydrous cyclohexane (67 cc.) is then added to the solution of lithium dimethylamide obtained, over the course of ten minutes at 40°C. After the addition, the reaction mixture is kept at ambient temperature for 10 minutes and then poured onto distilled water (470 cc.). The organic product is twice extracted with diethyl ether (a total of 450 cc.). The combined organic solutions are extracted with ice-cold N aqueous methanesulphonic acid solution (230 cc.) and then twice with distilled water (a total of 200 cc.). The combined acid extracts are rendered alkaline with 10 N sodium hydroxide solution. The oil which separates out is twice extracted with diethyl ether (a total of 460 cc.). The combined ether solutions are twice washed with distilled water (a total of 200 cc.), treated with vegetable charcoal (0.5 g.), dried over anhydrous magnesium sulphate, and concentrated. The residue (8.8 g.) is distilled under reduced pressure. The distilled product (6.7 g.; b.p. 195°–197°C/0.15 mm.Hg.) is dissolved in a mixture of anhydrous ethanol (18 cc.) and anhydrous diethyl ether (7 cc.). A solution (5.6 cc.) of hydrochloric acid in anhydrous diethyl ether, containing 4.0 mols per litre, is added to the solution obtained. After 2 hours' cooling at 2°C, the crystals which have appeared are filtered off, washed first with ice-cold anhydrous ethanol (8 cc.) and then twice with anhydrous diethyl ether (a total of 30 cc.), and dried under reduced pressure (20 mm.Hg.). 5-(3-Dimethylaminopropyl)-10,11-dihydrodibenzo[b,f]azepinone-10 hydrochloride (6.0 g.), m.p. 208°C. is obtained.

The 2-methyl-2'-methoxycarbonyl-N-(3-dimethylaminopropyl)-diphenylamine starting material can be prepared as follows. Preparation of ortho-tolylanthranilic acid (m.p. 190°C.) as in Example 1. Preparation of methyl N-ortho-tolylanthranilate (64.0 g., m.p. 60°C.) by reaction of thionyl chloride (38.8 g.), followed by an excess of methanol, with N-ortho-tolylanthranilic acid (56.5 g.) in the presence of hexamethylphosphotriamide (116 g.), in chloroform, at a temperature between 0° and 20°C. Preparation of 2-methyl-2'-methoxycarbonyl-N-(3-dimethylaminopropyl)-diphenylamine (10.5 g. b.p. 162°-166°C/0.1 mm.Hg.) by reaction of sodium hydride (1.34 g.) in refluxing 1,2-dimethoxyethane, followed by 1-chlorodimethylaminopropane (6.8 g.), in refluxing xylene, with methyl N-ortho-tolylanthranilate (9.65 g.).

EXAMPLE 3

Lithium (0.69 g.) is cut up and collected in a mixture of anhydrous benzene (50 cc.) and anhydrous hexamethylphosphotriamide (50 cc.). Anhydrous piperidine (8.75 g.) is added to the stirred suspension under an argon atmosphere at about 20°C. The mixture is stirred at 20°C. until the lithium has disappeared. A solution of 2-methyl-2'-methoxycarbonyl-N-(3-dimethylamino-2-methyl-propyl)diphenylamine (7.65 g.) in anhydrous cyclohexane (60 cc.) is then added to the lithium piperidylamide solution so obtained, over the course of 10 minutes at 35°C. After the addition, the reaction mixture is kept at a temperature of about 20°C. for a further 10 minutes and then poured into distilled water (500 cc.). The organic product is twice extracted with diethyl ether (a total of 400 cc.). The combined organic solutions are washed three times with distilled water (a total of 300 cc.) and then extracted twice with ice-cold 2N aqueous methanesulphonic acid solution (a total of 200 cc.). The combined acid extracts are rendered alkaline by adding 10 N sodium hydroxide solution (70 cc.). The oil which separates out is twice extracted with diethyl ether (a total of 300 cc.). The combined ether solutions are washed 3 times with distilled water (a total of 240 cc.), treated with vegetable charcoal (0.1 g.), dried over anhydrous magnesium sulphate, and concentrated to dryness. The residue (7.1 g.) is dissolved in boiling ethanol (15 cc.). A solution of fumaric acid (2.65 g.) in boiling ethanol (27 cc.) is added to the solution obtained. After 2 hours' cooling at 2°C, the crystals which have appeared are filtered off, washed first with ice-cold ethanol (5 cc.) and then with anhydrous diethyl ether (10 cc.), and dried under reduced pressure (20 mm.Hg.). 5-(3-Dimethylamino-2-methylpropyl)-10,11-dihydro-dibenzo-[b,f]azepinone-10 fumarate (7.15 g.), m.p. 165°C, is obtained.

The 2-methyl-2'-methoxycarbonyl-N-(3-dimethylamino-2-methyl-propyl)diphenylamine starting material can be prepared as follows. Preparation of methyl N-ortho-tolylanthranilate (m.p. 60°C.) as in Example 2. Preparation of 2-methyl-2'-methoxycarbonyl-N-(3-dimethylamino-2-methylpropyl)diphenylamine (33.6 g.) (b.p. 160°-163°C/0.1 mm.Hg. fumarate, m.p. 173°-174°C.) by reaction of sodium hydride (4.0 g.) in refluxing 1,2-dimethoxyethane, followed by 1-chloro-2-methyl-3-dimethylamino-propane (22.8 g.) in refluxing xylene, with methyl N-ortho-tolylanthranilate (29.0 g.).

EXAMPLE 4

Lithium (8.3 g.) is cut up and collected in a mixture of anhydrous benzene (110 cc.) and anhydrous hexamethylphosphotriamide (280 cc.). A solution (250 cc.) of anhydrous dimethylamine in anhydrous benzene, containing 5.0 mols per litre, is added to the stirred suspension under an argon atmosphere at about 20°C. The mixture is stirred at 20°C. until the lithium has disappeared. A solution of 2-methyl-2'-methoxycarbonyl-N-(2-dimethylaminoethyl)diphenylamine (58.0 g.) in anhydrous cyclohexane (450 cc.) is added to the lithium dimethylamide solution so obtained, over the course of 20 minutes at 40°C. After the addition, the reaction mixture is kept at a temperature of about 20°C. for 30 minutes and then poured into distilled water (2,000 cc.). The organic product is extracted three times with diethyl ether (a total of 1,500 cc.). The combined ethereal extracts are washed 4 times with distilled water (a total of 600 cc.) and then extracted twice with ice-cold 2N aqueous methanesulphonic acid solution (a total of 1,000 cc.). The combined acid extracts are rendered alkaline by adding 10N sodium hydroxide solution. The oil which separates out is twice extracted with diethyl ether (a total of 1,500 cc.). The combined ether solutions are washed three times with distilled water (a total of 450 cc.), dried over anhydrous magnesium sulphate, and concentrated to dryness. The residue (46.0 g.) is dissolved in boiling ethanol (80 cc.). A solution of fumaric acid (17.4 g.) in boiling ethanol (150 cc.) is added to the solution obtained. After 2 hours' cooling at 2°C, the crystals which have appeared are filtered off, washed first twice with ice-cold ethanol (a total of 30 cc.) and then with anhydrous diethyl ether (70 cc.), and dried under reduced pressure (20 mm.Hg.). 5-(2-Dimethylaminoethyl)-10,11-dihydro-dibenzo[b,f]-azepinone-10 fumarate (64.5 g.), m.p. 180°C, is obtained, The 2-methyl-2'-methoxycarbonyl-N-(2-dimethylaminoethyl)diphenylamine starting material can be prepared as follows. Preparation of methyl N-ortho-tolylanthranilate (m.p. 60°C.) as in Example 2. Preparation of 2-methyl-2'-methoxycarbonyl-N-(2-dimethylaminoethyl)-diphenylamine hydrochloride (63.0 g. m.p. 206°C.) by reaction of sodium hydride (8.0 g.) in refluxing 1,2-dimethoxyethane, followed by 1-chloro-2-dimethylaminoethane (36.6 g.) in refluxing xylene, with methyl N-ortho-tolylanthranilate (58.0 g.).

We claim:
1. Process for the preparation of 10,11-dihydro-dibenzo[b,f]-azepinones of the formula:

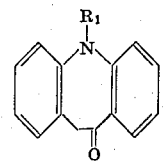

in which $R_1$ represents an alkyl radical of one to five carbon atoms, a phenylalkyl radical of which the alkyl portion contains 1 to 5 carbon atoms, or a radical of formula:

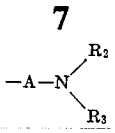

in which A represents an alkylene radical of two to six carbon atoms and $R_2$ and $R_3$ which may be identical or different, each represent an alkyl radical of one to five carbon atoms, and one of the radicals $R_2$ and $R_3$ can be attached to one of the carbon atoms of the alkylene radical A to form 2-, 3-, or 4-piperidyl, or both radicals $R_2$ and $R_3$, together with the nitrogen atom to which they are bonded, form 1-pyrrolidinyl, piperidino, morpholino, or 4-methyl-1-piperazinyl and, when

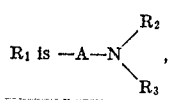

their acid addition salts, which comprises cyclizing an ester of the formula:

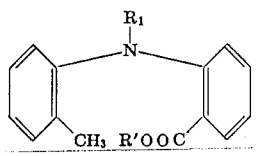

in which R' represents an alkyl radical of one to five carbon atoms and $R_1$ is as hereinbefore defined by reaction with a alkali metal amide of the formula:

in which M represents an alkali metal atom and $R_4$ and $R_5$, which may be identical of different, each represent an alkyl radical of one to five carbon atoms or form, together with the nitrogen atom to which they are bonded, 1-pyrrolidinyl, piperidino, or morpholino, using at least 3 mols of the said amide per mol of the acid ester and in the presence of at least one mol of hexamethylphosphotriamide per mol of said ester.

2. Process according to claim 1 in which M represents lithium.

3. Process according to claim 1 in which the reaction is carried out at 20° to 40°C.

4. Process according to claim 1 in which 4 to 6 mols of the alkali metal amide are used per mol of the ester.

5. Process according to claim 1 in which 5-(3-dimethylaminopropyl)-10,11-dihydrodibenzo[b,-f]azepinone-10 or an acid addition salt thereof is prepared by cyclizing 2-methyl-2'-methoxycarbonyl-N-(3-dimethylaminopropyl)-diphenylamine.

6. Process according to claim 1 in which the reaction mixture also contains, as an inert organic solvent, benzene, toluene or a xylene.

* * * * *